United States Patent
Oh et al.

(10) Patent No.: US 9,402,078 B2
(45) Date of Patent: *Jul. 26, 2016

(54) METHOD FOR DECODING CHROMA IMAGE USING LUMA QUANTIZATION

(71) Applicant: INFOBRIDGE PTE. LTD., Singapore (SG)

(72) Inventors: Soo Mi Oh, Seongnam (KR); Moonock Yang, Singapore (SG)

(73) Assignee: INFOBRIDGE PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/540,649

(22) Filed: Nov. 13, 2014

(65) Prior Publication Data

US 2015/0063448 A1 Mar. 5, 2015

Related U.S. Application Data

(63) Continuation of application No. 14/354,518, filed as application No. PCT/CN2012/084374 on Nov. 9, 2012, now Pat. No. 8,942,284.

(30) Foreign Application Priority Data

Nov. 25, 2011 (KR) .................. 10-2011-0124580

(51) Int. Cl.
*H04N 7/12* (2006.01)
*H04N 19/124* (2014.01)
(Continued)

(52) U.S. Cl.
CPC ......... *H04N 19/124* (2014.11); *H04N 19/0009* (2013.01); *H04N 19/105* (2014.11);
(Continued)

(58) Field of Classification Search
CPC .................................................. H04N 19/124
USPC .................................................... 375/240.12
See application file for complete search history.

(56) References Cited

U.S. PATENT DOCUMENTS

2004/0037360 A1* 2/2004 Moon .................... H04N 19/13
375/240.23
2011/0292999 A1* 12/2011 Jeong ............... H04N 19/00024
375/240.12

(Continued)

FOREIGN PATENT DOCUMENTS

CN 101742330 A 6/2010
EP 2086239 A2 8/2009

(Continued)

OTHER PUBLICATIONS

International Search Report for PCT/CN2012/084374 filed on Nov. 9, 2012.

(Continued)

*Primary Examiner* — Richard Torrente
(74) *Attorney, Agent, or Firm* — Birch, Stewart, Kolasch & Birch, LLP

(57) ABSTRACT

Provided is a method that derives a chroma intra prediction mode of a prediction unit, determines a size of a current chroma block using luma transform size information, generates a chroma prediction block of the current chroma block using the chroma intra prediction mode, generates a chroma residual block of the current chroma block using the chroma intra prediction mode and a chroma quantization parameter, generates a chroma reconstructed block adding the chroma prediction block and the chroma residual block, and the chroma quantization parameter is generated using a luma quantization parameter and information indicating the relationship between the luma quantization parameter and the chroma quantization parameter. Therefore, the coding efficiency is improved by adjusting the chroma quantization parameter per picture. Also, the amount of bits for transmitting the luma and chroma quantization parameters is reduced by encoding the luma quantization parameter using neighboring luma quantization parameters.

6 Claims, 5 Drawing Sheets

(51) Int. Cl.
- H04N 19/105 (2014.01)
- H04N 19/159 (2014.01)
- H04N 19/176 (2014.01)
- H04N 19/11 (2014.01)
- H04N 19/186 (2014.01)
- H04N 19/182 (2014.01)
- H04N 19/593 (2014.01)
- H04N 19/50 (2014.01)
- H04N 19/196 (2014.01)

(52) U.S. Cl.
CPC ............ *H04N 19/11* (2014.11); *H04N 19/159* (2014.11); *H04N 19/176* (2014.11); *H04N 19/182* (2014.11); *H04N 19/186* (2014.11); *H04N 19/196* (2014.11); *H04N 19/50* (2014.11); *H04N 19/593* (2014.11)

(56) References Cited

U.S. PATENT DOCUMENTS

| | | | | |
|---|---|---|---|---|
| 2012/0057784 A1* | 3/2012 | Horiuchi | ............ | H04N 19/176 382/166 |
| 2012/0328013 A1* | 12/2012 | Budagavi | ............ | H04N 19/105 375/240.12 |
| 2013/0003836 A1* | 1/2013 | Sasai | ............ | H04N 19/176 375/240.12 |
| 2013/0083845 A1* | 4/2013 | Yu | ............ | H04N 19/197 375/240.03 |
| 2014/0086502 A1* | 3/2014 | Guo | ............ | H04N 19/00024 382/238 |

FOREIGN PATENT DOCUMENTS

| | | |
|---|---|---|
| JP | 2013-150317 A | 8/2013 |
| WO | WO 2010/039734 A1 | 4/2010 |

OTHER PUBLICATIONS

Maani et al., "CE6.c: Differential Coding of Intra Modes," Joint Collaborative Team on Video Coding (JCT-VC) of ITU-T SG16 WP3 and ISO/IEC JTC1/SC29/WG11, 6th Meeting: Torino, IT, Document: JCTVC-F566, Jul. 14-22, 2011, 26 pages total.

Park et al., "CAVLC coding for intra prediction mode," Joint Collaborative Team on Video Coding (JCT-VC) of ITU-T SG16 WP3 and ISO/IEC JTC1/SC29/WG11, 6th Meeting: Torino, IT, Document: JCTVC-F106, Jul. 14-22, 2011, 10 pages.

Sullivan et al., "Meeting report of the second meeting of the Joint Collaborative Team on Video Coding (JCT-VC), . . . ," Joint Collaborative Team on Video Coding (JCT-VC) of ITU-T SG16 WP3 and ISO/IEC JTC1/SC29/WG11, 2nd Meeting: Geneva, CH, Document: JCTVC-B200, Jul. 21-28, 2010, 2 pages.

Suzuki et al., "Description of video coding technology proposal by Sony," Joint Collaborative Team on Video Coding (JCT-VC) of ITU-T SG16 WP3 and ISO/IEC JTC1/SC29/WG11, 1st Meeting: Dresden, DE, Document: JCTVC-A103, Apr. 15-23, 2010, 4 pages.

Bross et al., "High Efficiency Video Coding (HEVC) Text Specification draft 7," Joint Collaborative Team on Video Coding (JCT-VC) of ITU-T SG16 WP3 and ISO/IEC JTC1/SC29/WG11, Document: JCTVC-I1003_d9, 9th Meeting, Geneva, Switzerland, Apr. 27-May 7, 2012, 280 pages.

Bross et al., "WD4: Working Draft 4 of High-Efficiency Video Coding," Joint Collaborative Team on Video Coding (JCT-VC) of ITU-T SG16 WP3 and ISO/IEC JTC1/SC29/WG11, Document: JCTVC-F803 d6, 6th Meeting, Torino, Italy, Jul. 14-22, 2011, 229 pages.

Chono et al., "Efficient Binary Representation of cu_qp_delta Syntax for CABAC," Joint Collaborative Team on Video Coding (JCT-VC) of ITU-T SG16 WP3 and ISO/IEC JTC1/SC29/WG11, Document: JCTVC-F046-rl, MPEG No. m20458, 6th Meeting, Torino, Italy, Jul. 14-22, 2011, pp. 1-10.

Kondo et al., "Improvement of delta-QP Coding," Joint Collaborative Team on Video Coding (JCT-VC) of ITU-T SG16 WP3 and ISO/IEC JTC1/SC29/WG11, Document: JCTVC-F422, 6th Meeting, Torino, Italy, Jul. 14-22, 2011, pp. 1-6.

Sato et al., "CE4: Result of Combination 2.3.g + 2.3.e," Joint Collaborative Team on Video Coding (JCT-VC) of ITU-T SG16 WP3 and ISO/IEC JTC1/SC29/WG11, Document: JCTVC-F648, 6th Meeting, Torino, Italy, Jul. 14-22, 2011, pp. 1-4.

Sato et al., "Description of Core Experiment 4: Quantization," Joint Collaborative Team on Video Coding (JCT-VC) of ITU-T SG16 WP3 and ISO/IEC JTC1/SC29/WG11, Document: JCTVC-F904, 6th Meeting, Torino, Italy, Jul. 14-22, 2011, pp. 1-13.

Sato, "Proposal on Large Block Structure and Quantization," Joint Collaborative Team on Video Coding (JCT-VC) of ITU-T SG16 WP3 and ISO/IEC JTC1/SC29/WG11, Document: JCTVC-C167, 3rd Meeting, Guangzhou, China, Oct. 7-15, 2010, pp. 1-8.

Wiegand et al., "WD3: Working Draft 3 of High-Efficiency Video Coding," Joint Collaborative Team Video Coding (JCT-VC) of ITU-T SG16 WP3 and ISO/IEC JTC1/SC29/WG11, Document: JCTVC-E603, 5th Meeting, Geneva, Switzerland, Mar. 16-23, 2011, 217 pages.

Zhang et al., "Method for Deriving Chroma QP from Luma QP," Joint Collaborative Team on Video Coding (JCT-VC) of ITU-T SG16 WP3 and ISO/IEC JTC1/SC29/WG11, Document: JCTVC-F277, 6th Meeting, Torino, Italy, Jul. 14-22, 2011 (Jun. 30, 2011), pp. 1-6, XP-030009300.

Zhang et al., "Method for Deriving Chroma QP from Luma QP," Joint Collaborative Team on Video Coding (JCT-VC) of ITU-T SG16 WP3 and ISO/IEC JTC1/SC29/WG11, Document: JCTVC-F277, 6th Meeting, Torino, Italy, Jul. 14-22, 2011, pp. 1-6.

* cited by examiner

METHOD FOR DECODING CHROMA IMAGE USING LUMA QUANTIZATION

CROSS-REFERENCE TO RELATED APPLICATIONS

This application is a continuation of U.S. application Ser. No. 14/358,518, filed Apr. 25, 2014 (now U.S. Pat. No. 8,942,284), which is the National Stage of PCT Application No. PCT/CN2012/084374, filed Nov. 9, 2012, which claims priority of Korean Application No. 10-2011-0124580, filed Nov. 25, 2001, which are incorporated by reference in their entirety.

TECHNICAL FIELD

The present invention relates to a method for decoding chroma image, and more particularly, to a method and apparatus of generating a chroma prediction block and a chroma residual block according to a chroma intra prediction mode and a size of a transform unit.

BACKGROUND ART

In H.264/MPEG-4 AVC, one picture is divided into macroblocks to encode an image, the respective macroblocks are encoded by generating a prediction block using inter prediction or intra prediction. The difference between an original block and the prediction block is transformed to generate a transformed block, and the transformed block is quantized using a quantization parameter and one of a plurality of predetermined quantization matrices. The quantized coefficient of the quantized block are scanned by a predetermined scan type and then entropy-coded. The quantization parameter is adjusted per macroblock and encoded using a previous quantization parameter.

Meanwhile, in HEVC (High Efficiency Video Coding) under construction, various sizes of coding unit are introduced to obtain two times of compression efficiency. The coding unit has a role similar to the macroblock of H.264.

But, if the luma and chroma quantization parameter is adjusted per coding unit, the number of quantization parameters to be encoded increases as the size of the coding unit is smaller. Therefore, adjusting luma and chroma quantization parameter per coding unit results in greater quantity of coding bits required to encode the quantization parameter, which degrades the coding efficiency. Also, because using various sizes of coding unit makes the correlation between the quantization parameter and the previous quantization parameter weaker than that of H.264, a new method of encoding and decoding the quantization parameter is required for various sizes of the coding unit. Accordingly, more effective method is required to encode and decode the image for luma and chroma component.

DISCLOSURE

Technical Problem

The present invention is directed to a method for generating a chroma prediction block and a chroma residual block to generate a chroma reconstructed block.

Technical Solution

One aspect of the present invention provides a method for decoding chroma image, comprising: deriving a chroma intra prediction mode of a prediction unit; determining a size of a current chroma block using luma transform size information; generating a chroma prediction block of the current chroma block using the chroma intra prediction mode; generating a chroma residual block of the current chroma block using the chroma intra prediction mode and a chroma quantization parameter; and generating a chroma reconstructed block adding the chroma prediction block and the chroma residual block.

Advantageous Effects

A method according to the present invention derives a chroma intra prediction mode of a prediction unit, determines a size of a current chroma block using luma transform size information, generates a chroma prediction block of the current chroma block using the chroma intra prediction mode, generates a chroma residual block of the current chroma block using the chroma intra prediction mode and a chroma quantization parameter, generates a chroma reconstructed block adding the chroma prediction block and the chroma residual block, and the chroma quantization parameter is generated using a luma quantization parameter and information indicating the relationship between the luma quantization parameter and the chroma quantization parameter. Therefore, the coding efficiency is improved by adjusting the chroma quantization parameter per picture. Also, the amount of bits for transmitting the luma and chroma quantization parameters is reduced by encoding the luma quantization parameter using neighboring luma quantization parameters.

MODE FOR INVENTION

Hereinafter, various embodiments of the present invention will be described in detail with reference to the accompanying drawings. However, the present invention is not limited to the exemplary embodiments disclosed below, but can be implemented in various types. Therefore, many other modifications and variations of the present invention are possible, and it is to be understood that within the scope of the disclosed concept, the present invention may be practiced otherwise than as has been specifically described.

Figure 1:
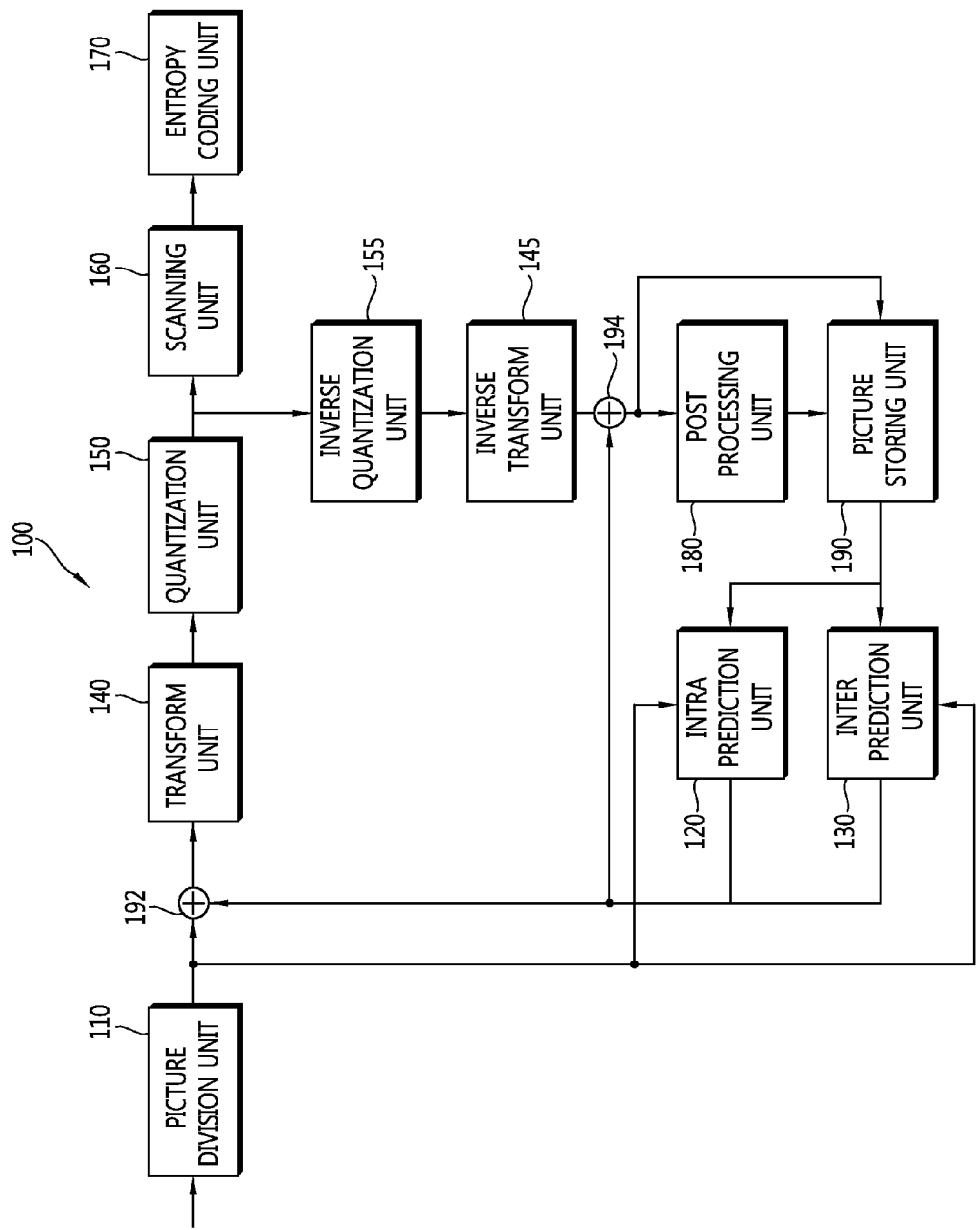
FIG. 1 is a block diagram of an image coding apparatus according to the present invention.

FIG. 1 is a block diagram of an image coding apparatus 100 according to the present invention.

Referring to FIG. 1, the image coding apparatus 100 according to the present invention includes a picture division unit 110, an intra prediction unit 120, an inter prediction unit 130, a transform unit 140, a quantization unit 150, a scanning unit 160, an entropy coding unit 170, an inverse quantization unit 155, an inverse transform unit 145, a post-processing unit 180, a picture storing unit 190, a subtractor 192 and an adder 194.

The picture division unit 110 divides a picture into slices, divides a slice into largest coding units (LCUs), and divides each LCU into one or more coding units. The picture division unit 110 determines prediction mode of each coding unit and a size of prediction unit. The picture, slice and coding unit are comprised of luminance sample array (luma array) and two chrominance sample arrays (chroma arrays). A chroma block has half the height and half the width of a luma block. The block may be a LCU, coding unit or a prediction unit. Hereafter, a luma coding unit, a luma prediction unit and a luma transform unit is referred to as a coding unit, a prediction unit and a transform unit respectively.

An LCU includes one or more coding units. The LCU has a recursive quad tree structure to specify a division structure of coding units. Parameters for specifying the maximum size and the minimum size of the coding unit are included in a sequence parameter set. The division structure is specified by one or more split coding unit flags (split_cu_flags). The size of a coding unit is 2N×2N.

A coding unit includes one or more prediction units. In intra prediction, the size of the prediction unit is 2N×2N or N×N. In inter prediction, the size of the prediction unit is 2N×2N, 2N×N, N×2N or N×N.

A coding unit includes one or more transform units. The transform unit has a recursive quad tree structure to specify a division structure. The division structure is specified by one or more split transform unit flags (split_tu_flags). Parameter for specifying the maximum size and the minimum size of the luma transform unit is included in a sequence parameter set. The chroma transform unit has half the height and half the width of the transform unit if the transform unit is not 4×4. The minimum size of the chroma transform unit is 4×4.

The intra prediction unit 120 determines an intra prediction mode of a current prediction unit and generates a prediction block using the intra prediction mode. A size of the prediction block is equal to a size of the transform unit.

The inter prediction unit 130 determines motion information of the current prediction unit using one or more reference pictures stored in the picture storing unit 190, and generates a prediction block of the prediction unit. The motion information includes one or more reference picture indexes and one or more motion vectors.

The transform unit 140 transforms residual signals generated using an original block and a prediction block to generate a transformed block. The residual signals are transformed by the transform unit. A transform type is determined by the prediction mode and the size of the transform unit. The transform type is a DCT-based integer transform or a DST-based integer transform. Inter prediction, DCT-based integer transforms are used. In intra prediction mode, if the size of the transform unit is smaller than a predetermined size, the DST-based integer transforms are used, otherwise the DCT-based integer transforms are used. The predetermined size is 8×8. The transform type for the chroma transform unit is the DCT-based integer transform.

The quantization unit 150 determines a quantization parameter for quantizing the transformed block. The quantization parameter is a quantization step size. The quantization parameter is the luma quantization parameter. The quantization parameter is determined per quantization unit. The size of the quantization unit is one of allowable sizes of coding unit. If a size of the coding unit is equal to or larger than the size of a minimum quantization unit, the coding unit becomes the quantization unit. A plurality of coding units may be included in the minimum quantization unit. The size of the minimum quantization unit is determined per picture and a parameter for specifying the size of the minimum quantization unit is included in a picture parameter set. A chroma quantization parameter for each chroma component is determined by the quantization parameter. The relationship between the quantization parameter and the chroma quantization parameter may be determined by the picture. A parameter (chroma_qp_index_offset) for indicating the relationship is transmitted in a picture parameter set (PPS). The relationship may be changed by the slice. Another parameter for changing the relationship may be transmitted in a slice header.

The quantization unit 150 generates a quantization parameter predictor and generates a differential quantization parameter by subtracting the quantization parameter predictor from the quantization parameter. The differential quantization parameter is entropy-coded.

The quantization parameter predictor is generated by using quantization parameters of neighboring coding units and quantization parameter of previous coding unit as follows.

A left quantization parameter, an above quantization parameter and a previous quantization parameter are sequentially retrieved in this order. An average of the first two available quantization parameters retrieved in that order is set as the quantization parameter predictor when two or more quantization parameters are available, and when only one quantization parameter is available, the available quantization parameter is set as the quantization parameter predictor. That is, if the left and above quantization parameter are available, the average of the left and above quantization parameter is set as the quantization parameter predictor. If only one of the left and above quantization parameter is available, the average of the available quantization parameter and the previous quantization parameter is set as the quantization parameter predictor. If both of the left and above quantization parameter are unavailable, the previous quantization parameter is set as the quantization parameter predictor. The average is rounded off.

The quantization unit 150 quantizes the transformed block using a quantization matrix and the quantization parameter to generate a quantized block. The quantized block is provided to the inverse quantization unit 155 and the scanning unit 160.

The scanning unit 160 determines a scan pattern and applies the scan pattern to the quantized block. When CABAC is used for entropy coding, the scan pattern is determined as follows.

In intra prediction, the scan pattern is determined by the intra prediction mode and the size of the transform unit. The size of the transform unit, the size of transformed block and the size of the quantized block are same. The scan pattern is selected among a diagonal scan, vertical scan and horizontal scan. The quantized transform coefficients of the quantized block are split into significant flags, coefficient signs and coefficient levels. The scan pattern is applied to the significant flags, coefficient signs and coefficient levels respectively. The significant flag indicates whether the corresponding quantized transform coefficient is zero or not. The coefficient sign indicates a sign of non-zero quantized transform coefficient, and the coefficients level indicates an absolute value of non-zero quantized transform coefficient.

When the size of the transform unit is equal to or smaller than a first size, the horizontal scan is selected for the vertical mode and a predetermined number of neighboring intra prediction modes of the vertical mode in directionality, the vertical scan is selected for the horizontal mode and the predetermined number of neighboring intra prediction modes of the horizontal mode in directionality, and the diagonal scan is selected for the other intra prediction modes. When the size of the transform unit is larger than the first size, the diagonal scan is used. The first size is 8×8.

In inter prediction, a predetermined scan pattern is used regardless of the size of the transform unit. The predetermined scan pattern is the diagonal scan when the CABAC is used for entropy coding.

The scan pattern of a chroma transform unit is equal to the scan pattern of a corresponding luma transform unit. The minimum size of the chroma transform unit is 4×4.

When the size of the transform unit is larger than a second size, the quantized block is divided into a main subset and a plurality of remaining subsets and the determined scan pattern is applied to each subset. Significant flags, coefficient signs and coefficients levels of each subset are scanned respectively according to the determined scan pattern. The main subset includes DC coefficient and the remaining subsets covers the region other than the region covered by the main subset. The second size is 4×4. The subset is a 4×4 block containing 16 transform coefficients. The subset for chroma is also a 4×4 block containing 16 transform coefficients.

The scan pattern for scanning the subsets is the same as the scan pattern for scanning quantized transform coefficients of each subset. The quantized transform coefficients of each subset are scanned in the reverse direction. The subsets are also scanned in the reverse direction.

Last non-zero coefficient position is encoded and transmitted to the decoder. The last non-zero coefficient position specifies a position of last non-zero quantized transform coefficient within the transform unit. The last non-zero coefficient position is used to determine the number of subsets to be signaled in the decoder. Non-zero subset flag is set for the subsets other than the main subset and the last subset. The last subset covers the last non-zero coefficient. The non-zero subset flag indicates whether the subset contains non-zero coefficients or not.

The inverse quantization unit 155 inversely quantizes the quantized transform coefficients of the quantized block.

The inverse transform unit 145 inversely transforms the inverse quantized block to generate residual signals of the spatial domain.

The adder 194 generates a reconstructed block by adding the residual block and the prediction block.

The post-processing unit 180 performs a deblocking filtering process for removing blocking artifact generated in a reconstructed picture.

The picture storing unit 190 receives post-processed image from the post-processing unit 180, and stores the image in picture units. A picture may be a frame or a field.

The entropy coding unit 170 entropy-codes the one-dimensional coefficient information received from the scanning unit 160, intra prediction information received from the intra prediction unit 120, motion information received from the inter prediction unit 130, and so on.

Figure 2:
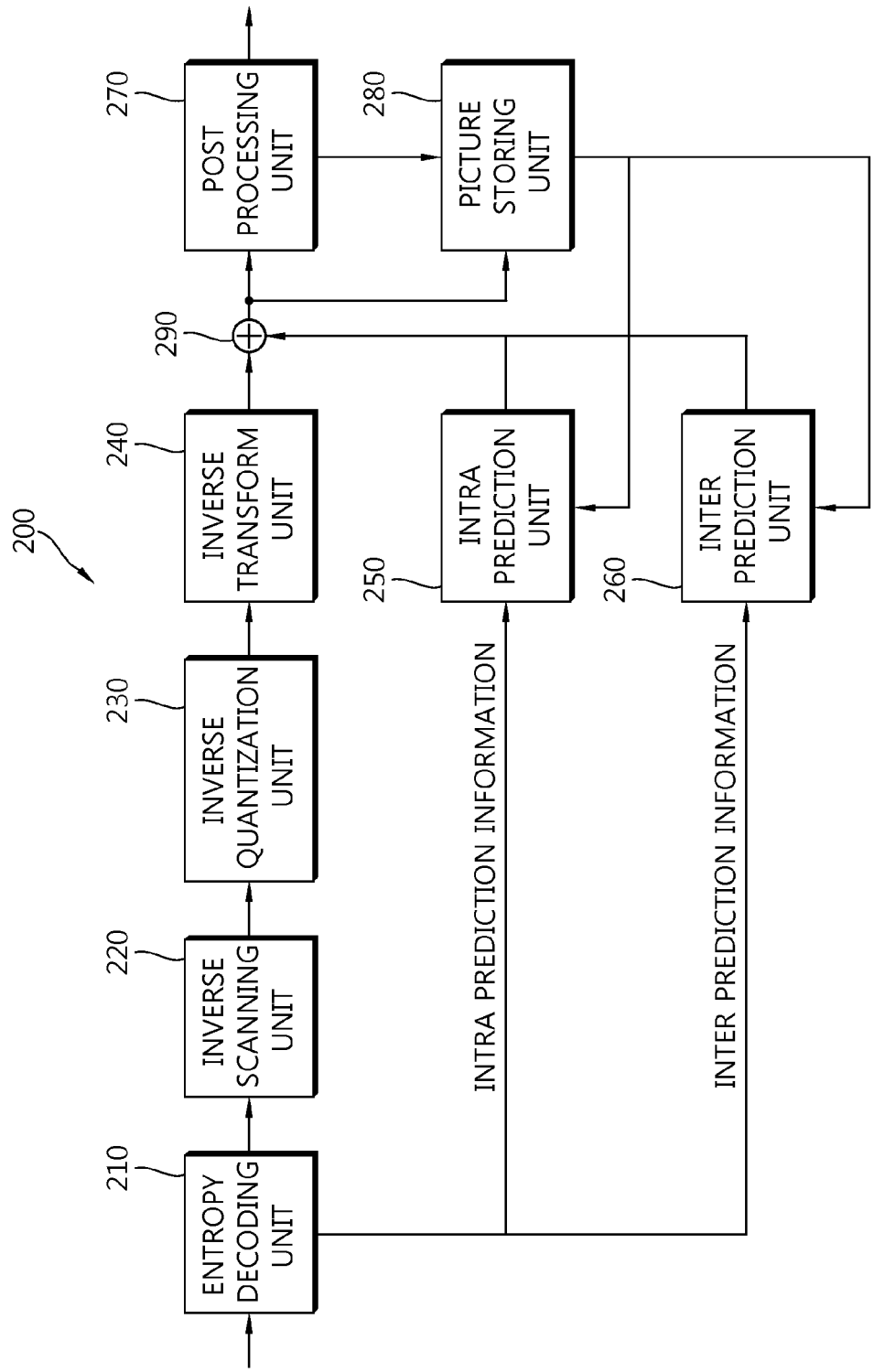
FIG. 2 is a block diagram of an image decoding apparatus according to the present invention.

FIG. 2 is a block diagram of an image decoding apparatus 200 according to the present invention.

The image decoding apparatus 200 according to the present invention includes an entropy decoding unit 210, an inverse scanning unit 220, an inverse quantization unit 230, an inverse transform unit 240, an intra prediction unit 250, an inter prediction unit 260, a post-processing unit 270, a picture storing unit 280, an adder 290 and a switch 295.

The entropy decoding unit 210 extracts the intra prediction information, the inter prediction information and the one-dimensional coefficient information from a received bit stream. The entropy decoding unit 210 transmits the inter prediction information to the inter prediction unit 260, the intra prediction information to the intra prediction unit 250 and the coefficient information to the inverse scanning unit 220.

The inverse scanning unit 220 uses an inverse scan pattern to generate quantized block. When CABAC is used for entropy coding, the scan pattern is determined as follows.

In intra prediction, the inverse scan pattern is determined by the intra prediction mode and the size of the transform unit. The inverse scan pattern is selected among a diagonal scan, vertical scan and horizontal scan. The selected inverse scan pattern is applied to significant flags, coefficient signs and coefficients levels respectively to generate the quantized block. The inverse scan pattern of the chroma transform unit is equal to the scan pattern of a corresponding luma transform unit. The minimum size of the chroma transform unit is 4×4.

When the size of the transform unit is equal to or smaller than a first size, the horizontal scan is selected for the vertical mode and a predetermined number of neighboring intra prediction modes of the vertical mode, the vertical scan is selected for the horizontal mode and the predetermined number of neighboring intra prediction modes of the horizontal mode, and the diagonal scan is selected for the other intra prediction modes. When the size of the transform unit is larger than the first size, the diagonal scan is used. When the size of the transform unit is larger than the first size, the diagonal scan is selected for all intra prediction modes. The first size is 8×8.

In inter prediction, the diagonal scan is used.

When the size of the transform unit is larger than the second size, the significant flags, the coefficient signs and the coefficients levels are inversely scanned in the unit of subset using the determined inverse scan pattern to generate subsets, and the subsets are inversely scanned to generate the quantized block. The second size is equal to the size of the subset. The subset is a 4×4 block including 16 transform coefficients. The subset for chroma is also a 4×4 block. Therefore, when the size of the chroma transform unit is larger than the second size, the subsets are generated first and the subsets are inversely scanned.

The inverse scan pattern used for generating each subset is the same as the inverse scan pattern used for generating the quantized block. The significant flags, the coefficient signs and the coefficient levels are inversely scanned in the reverse direction. The subsets are also inversely scanned in the reverse direction.

The last non-zero coefficient position and the non-zero subset flags are received from the encoder. The number of encoded subsets is determined according to the last non-zero coefficient position and the inverse scan pattern. The non-zero subset flags are used to select subsets to be generated. The main subset and the last subset are generated using the inverse scan pattern.

The inverse quantization unit 230 receives the differential quantization parameter from the entropy decoding unit 210 and generates the quantization parameter predictor to generate the quantization parameter of the coding unit. The operation of generating the quantization parameter is the same as the operation of the quantization unit 150 of FIG. 1. Then, the quantization parameter of the current coding unit is generated by adding the differential quantization parameter and the quantization parameter predictor. If the differential quantization parameter for the current coding unit is not received from the encoder, the differential quantization parameter is set to 0.

A parameter for indicating the relationship between the quantization parameter and the chroma quantization parameter is included in the PPS. Another parameter is included in the slice header if it is allowed to change the relationship by the slice. Therefore, the chroma quantization parameter is generated using the quantization parameter and the parameter included in the PPS or using the quantization parameter and the two parameters.

The inverse quantization unit 230 inversely quantizes the quantized block.

The inverse transform unit 240 inversely transforms the inverse-quantized block to restore a residual block. The inverse transform type is adaptively determined according to the prediction mode and the size of the transform unit. The inverse transform type is the DCT-based integer transform or the DST-based integer transform. For example, in inter prediction, DCT-based integer transforms are used. In intra prediction mode, if the size of the transform unit is smaller than a predetermined size, the DST-based integer transforms are used, otherwise the DCT-based integer transforms are used. The inverse transform type for the chroma transform unit is the DCT-based integer transform.

The intra prediction unit 250 restores the intra prediction mode of the current prediction unit using the received intra prediction information, and generates a prediction block according to the restored intra prediction mode.

The inter prediction unit 260 restores the motion information of the current prediction unit using the received inter prediction information, and generates a prediction block using the motion information.

The post-processing unit 270 operates the same as the post-processing unit 180 of FIG. 1.

The picture storing unit 280 receives post-processed image from the post-processing unit 270, and stores the image in picture units. A picture may be a frame or a field.

The adder 290 adds the restored residual block and a prediction block to generate a reconstructed block.

Figure 3:
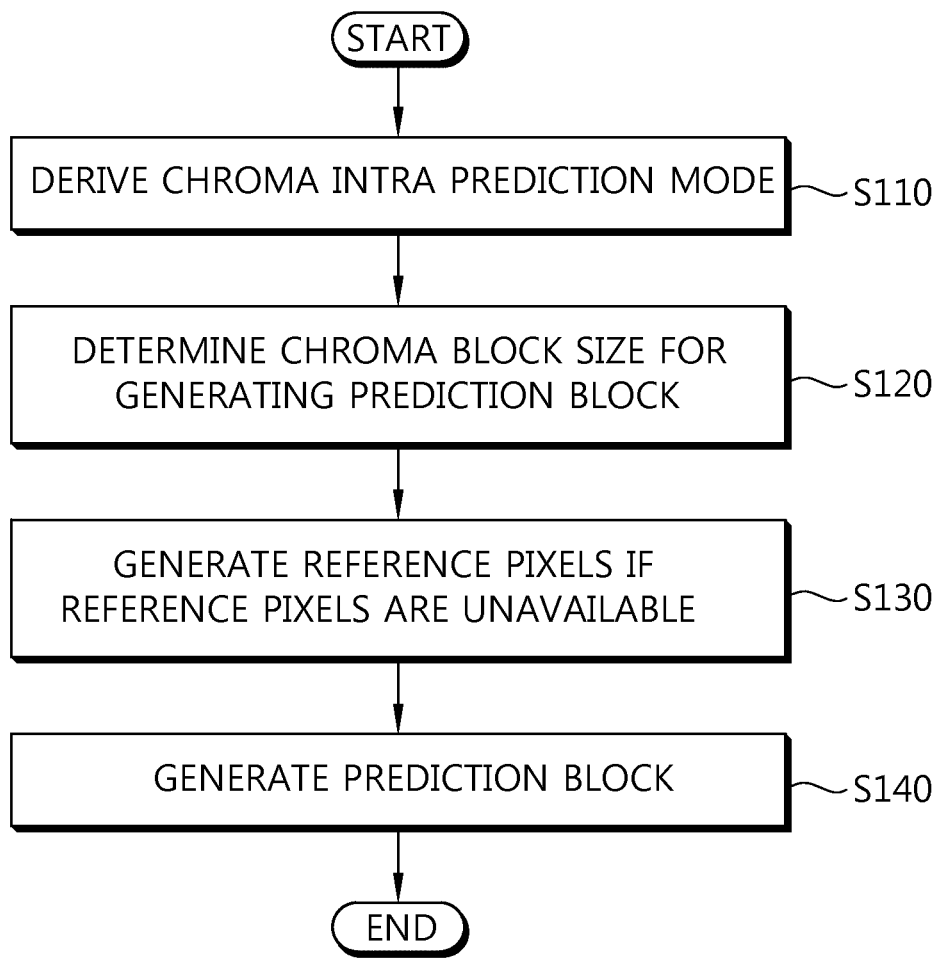
FIG. 3 is a block diagram of an apparatus of generating a prediction block according to the present invention.

FIG. 3 is a flow chart illustrating a procedure of generating a chroma prediction block in intra prediction mode according to the present invention.

A chroma intra prediction mode of a chroma prediction unit is derived using an intra prediction index (S110). The chroma intra prediction mode group includes a DC mode, a planar mode, a vertical mode, a horizontal mode, a LM mode and a DM mode. The DM mode is set to a luma intra prediction mode of corresponding luma prediction unit. If the luma intra prediction mode is one of the DC mode, the planar mode, the vertical mode, the horizontal mode and the LM mode, the mode is replaced with a vertical right mode. The chroma prediction unit has half the width and half the height of the luma prediction unit.

A size of a current chroma block is determined to generated a chroma prediction block based on the transform size information specifying the size of the luma transform unit (S120).

The transform size information may be one or more split_tu_flags. Therefore, the current chroma block has the same size of the chroma transform unit. The minimum size of the chroma prediction block is 4×4. The chroma transform unit has half the width and height of the corresponding luma transform unit.

If the chroma transform unit has the same size of the prediction unit, the prediction unit is set as the current block.

If the size of the chroma transform unit is smaller than the size of the chroma prediction unit, the prediction unit is comprised of multiple sub-blocks of the prediction unit having the same size of the transform unit. Each sub-block is set as the current chroma block. In this case, the steps S130 and S140 are performed for the first sub-block of the prediction unit. Then, the steps S130 and S140 are repeatedly performed for the remaining sub-blocks of the chroma prediction unit in decoding order. Same chroma intra prediction mode is used for all the sub-block within the chroma prediction unit.

Reference pixels are generated if one or more reference pixels of the current chroma block are unavailable (S130). The reference pixels of the current chroma block are comprised of above reference pixels located at (x=0, ..., 2N−1, y=−1), left reference pixels located at (x=1−, y=0, ..., 2M−1) and a corner pixel located at (x=−1, y=−1). N is the width of the current chroma block and M is the height of the current chroma block. The current chroma block may be the prediction unit or the sub-block of the prediction.

If all reference pixels are unavailable, the value of $2^{L-1}$ is substituted for the values of all the reference pixels. The value of L is the number of bits used to represent luminance pixel value.

If available reference pixels are located at only one side of the unavailable reference pixel, the value of the reference pixel nearest to the unavailable pixel is substituted for the unavailable reference pixel.

If available reference pixels are located at both sides of the unavailable reference pixel, the average value of the reference pixels nearest to the unavailable pixel in each side or the value of the reference pixel nearest to the unavailable pixel in a predetermined direction is substituted for each unavailable reference pixel.

The reference pixels of the current chroma block are not filtered regardless of the chroma intra prediction mode and the size of the chroma transform unit.

A prediction block of the current chroma block is generated (S140).

The prediction block is generated using the chroma intra prediction mode. The prediction block is generated through the same operation of generating luma prediction block for DC mode, planar mode, vertical mode and horizontal mode.

Figure 4:
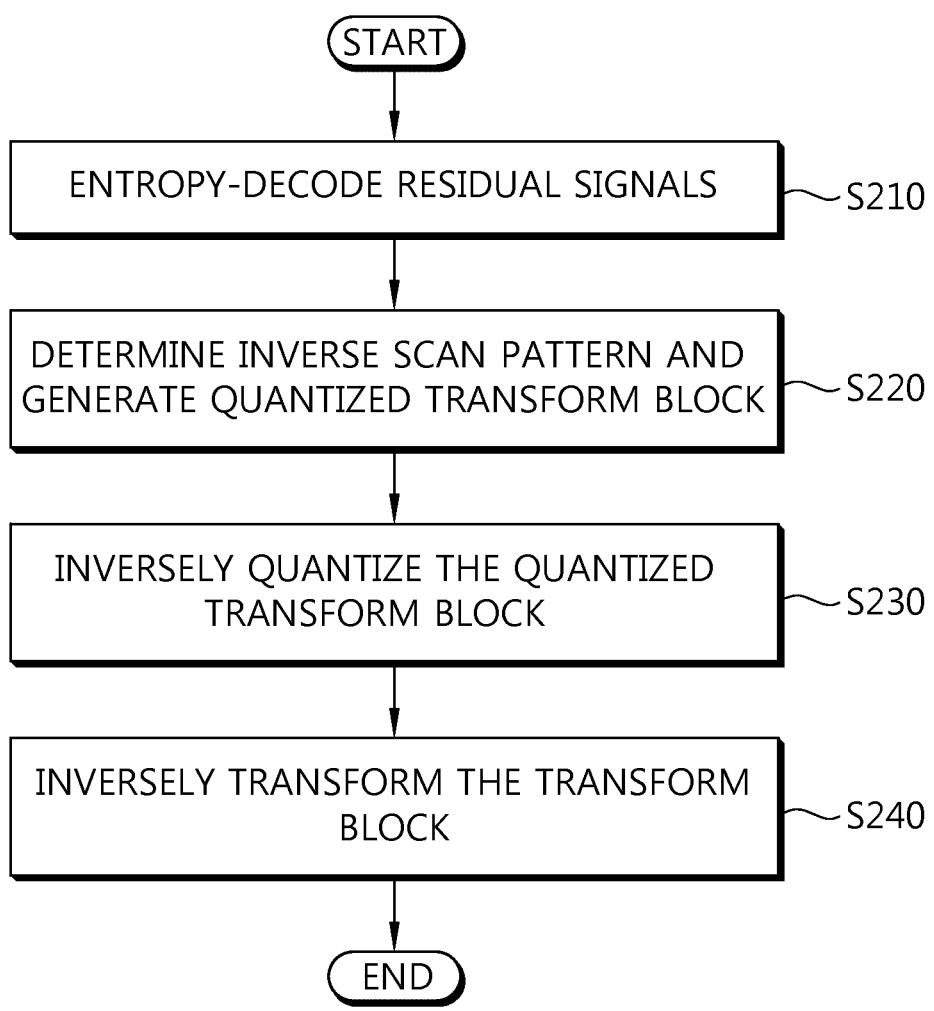
FIG. 4 is a conceptual diagram illustrating intra prediction modes according to the present invention.

FIG. 4 is a flow chart illustrating a procedure of generating a chroma residual block according to the present invention.

The encoded residual signals are entropy-decoded to generate quantized coefficient information (S210). When CABAC is used for entropy coding, the coefficients information includes significant flags, coefficient signs and coefficient levels. The significant flag indicates whether the corresponding quantized transform coefficient is zero or not. The coefficient sign indicates a sign of non-zero quantized transform coefficient, and the coefficients level indicates an absolute value of non-zero quantized transform coefficient.

An inverse scan pattern is determined and a quantized block is generated according the inverse scan pattern (S220).

In intra prediction, the inverse scan pattern is determined by the chroma intra prediction mode and the size of the chroma transform unit. The inverse scan pattern is selected among a diagonal scan, vertical scan and horizontal scan. The selected inverse scan pattern is applied to significant flags, coefficient signs and coefficients levels respectively to generate the quantized block. The inverse scan pattern of the chroma transform unit is equal to the scan pattern of a corresponding luma transform unit. The minimum size of the chroma transform unit is 4×4.

Therefore, when the size of the chroma transform unit is equal to 4×4, the horizontal scan is selected for the vertical mode and a predetermined number of neighboring intra prediction modes of the vertical mode, the vertical scan is selected for the horizontal mode and the predetermined number of neighboring intra prediction modes of the horizontal mode, and the diagonal scan is selected for the other intra prediction modes. When the size of the transform unit is larger than 4×4, the diagonal scan is used.

In inter prediction, the diagonal scan is used.

When the size of the chroma transform unit is larger than the second size, the significant flags, the coefficient signs and the coefficients levels are inversely scanned in the unit of subset using the determined inverse scan pattern to generate subsets, and the subsets are inversely scanned to generate the quantized block. The second size is equal to the size of the subset. The subset is a 4×4 block including 16 transform coefficients.

The inverse scan pattern used for generating each subset is the same as the inverse scan pattern used for generating the quantized block. The significant flags, the coefficient signs and the coefficient levels are inversely scanned in the reverse direction. The subsets are also inversely scanned in the reverse direction.

The last non-zero coefficient position and the non-zero subset flags are received from the encoder. The number of encoded subsets is determined according to the last non-zero coefficient position and the inverse scan pattern. The non-zero subset flags are used to select subsets to be generated. The main subset and the last subset are generated using the inverse scan pattern.

The quantized block is inversely quantized using a chroma quantization parameter (S230). The chroma quantization parameter for each chroma component is derived from luma quantization parameter. The parameter (chroma_qp_index_offset) for indicating the relationship between the luma quantization parameter and the chroma quantization parameter is extracted from the PPS. Another parameter is also extracted from the slice header if the relationship is changed per slice. Therefore, the luma quantization parameter is generated and the parameter for indicating the relationship is extracted from the received bit stream. Then, the chroma quantization parameter is generated using the luma quantization parameter and the parameters.

Figure 5:
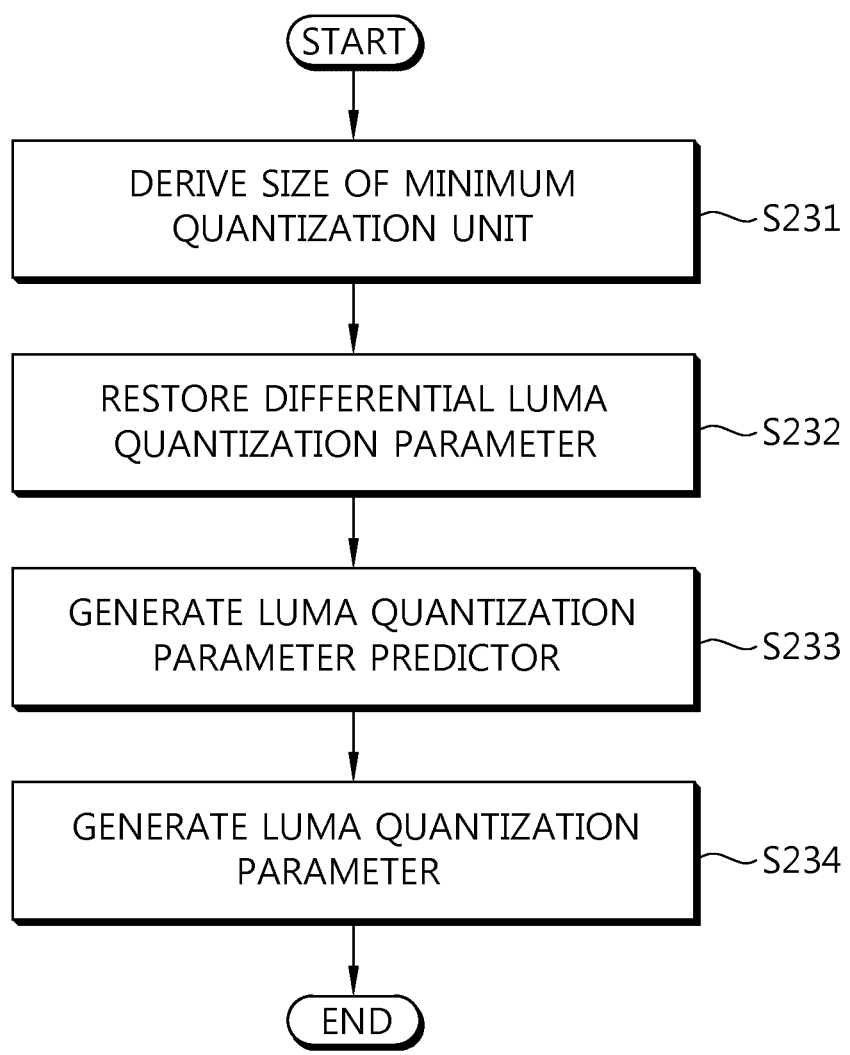
FIG. 5 is a block diagram of an apparatus of generating a residual block according to the present invention.

FIG. 5 is a flow chart illustrating a procedure of deriving luma quantization parameter according to the present invention.

A minimum size of a quantization unit is derived (S231). The minimum size of the quantization unit is equal to a size of LCU or a size of sub-block of LCU. The minimum size of the quantization unit is determined per picture. A parameter (cu_qp_delta_enabled_info) specifying the depth of the minimum size of the quantization unit is extracted from PPS. The minimum size of the quantization unit is derived as following equation:

$$\text{Log 2(MinQUSize)} = \text{Log 2(MaxCUSize)} - cu\_qp\_delta\_enabled\_info$$

The MinQUSize is the minimum size of the quantization unit. The MaxCUSize is the size of LCU. Only one parameter is used for deriving the minimum size of the quantization unit.

A differential luma quantization parameter (dQP) of the current coding unit is restored (S232). The dQP is restored per quantization unit. For example, if the size of the current coding unit is equal to or larger than the minimum size of the quantization unit, the dQP is restored for the current coding unit. If the current coding unit does not contain an encoded dQP, the dQP is set to zero. If the quantization unit includes plural coding units, a first coding unit containing the dQP and the following coding unit within the quantization unit have same dQP.

The encoded dQP is arithmetically decoded to generate a bin string, and the bin string is converted into the dQP. The bin string comprises a bin for indicating the dQP is zero or not. When the dQP is not zero, the bin string further comprises a bin for sign of the dQP, and a bin string for indicating absolute value of the dQP.

A luma quantization parameter predictor of the current coding unit is generated (S233).

The luma quantization parameter predictor is generated by using luma quantization parameters of neighboring coding units and a luma quantization parameter of previous coding unit as follows.

A left luma quantization parameter, an above luma quantization parameter and a previous luma quantization parameter are sequentially retrieved in this order. An average of the first two available luma quantization parameters retrieved in that order is set as the luma quantization parameter predictor when two or more luma quantization parameters are available, and when only one luma quantization parameter is available, the available luma quantization parameter is set as the luma quantization parameter predictor. That is, if the left and above luma quantization parameter are available, the average of the left and above luma quantization parameter is set as the luma quantization parameter predictor. If only one of the left and above luma quantization parameter is available, the average of the available luma quantization parameter and the previous luma quantization parameter is set as the luma quantization parameter predictor. If both of the left and above luma quantization parameter are unavailable, the previous luma quantization parameter is set as the luma quantization parameter predictor. The average is rounded off.

If the quantization unit includes plural coding units, the luma quantization parameter predictor of the first coding unit in the decoding order is generated, and the generated luma quantization parameter predictor is used for all the coding units within the quantization unit.

The luma quantization parameter is generated using the dQP and the luma quantization parameter predictor (S234).

Meanwhile, the user-defined quantization matrices are also restored. A set of the user-defined quantization matrices is received from the encoding apparatus through the SPS or the PPS. The user-defined quantization matrix is restored using inverse DPCM. The diagonal scan is used for the DPCM. When the size of the user-defined quantization matrix is larger than 8×8, the user-defined quantization matrix is restored by up-sampling the coefficients of the received 8×8 quantization matrix. The DC coefficient of the user-defined quantization matrix is extracted from the SPS or the PPS. For example, if the size of the user-defined quantization matrix is 16×16, coefficients of the received 8×8 quantization matrix are up-sampled using 1:4 up-sampling.

A residual block is generated by inversely transforming the inverse-quantized block (S1440). An inverse transform type may be fixed. The DCT-based integer transform is used for a horizontal transform and a vertical transform.

A reconstructed chroma block is generated by adding the chroma prediction block and the chroma residual block.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. An apparatus for decoding a chroma image, comprising:
an intra prediction unit for deriving a chroma intra prediction mode of a prediction unit, determining a size of a chroma prediction block using luma transform size information and generating the chroma prediction block using the chroma intra prediction mode;
a residual block generating unit for generating a chroma residual block using the chroma intra prediction mode and a chroma quantization parameter; and an adder for generating a chroma reconstructed block by adding the chroma prediction block and the chroma residual block, wherein the chroma quantization parameter is generated using a luma quantization parameter determined per quantization unit and information indicating the relationship between the luma quantization parameter and the chroma quantization parameter, the luma quantization parameter is generated using a luma quantization parameter predictor and a luma differential quantization parameter, if both of a left luma quantization parameter and an above luma quantization parameter are available, an average of the left luma quantization parameter and the above luma quantization parameter is set as the luma quantization parameter predictor, and if only one of the left luma quantization parameter and the above luma quantization parameter is available, an average of the available luma quantization parameter and the luma previous quantization parameter is set as the luma quantization parameter predictor.

2. The apparatus of claim 1, wherein a minimum size of the quantization unit is adjusted per picture.

3. The apparatus of claim 1, wherein a minimum size of the quantization unit is derived using a parameter specifying a depth of the minimum size of the quantization unit and a size of a largest coding unit.

4. The apparatus of claim 1, wherein the luma differential quantization parameter is restored by arithmetic-decoding an encoded luma differential quantization parameter to generate a bin string and by applying inverse binarization to the bin string.

5. The apparatus of claim 4, wherein the bin string includes a bin string indicating an absolute value of the luma differential quantization parameter and a bin indicating a sign of the luma differential quantization parameter.

6. The apparatus of claim 1, wherein if the chroma intra prediction mode is a derived mode (DM mode), the chroma prediction block is generated using a corresponding luma intra prediction mode.

* * * * *